March 27, 1956  J. KOLBE  2,739,823
BANKING ARM SUPPORTED VEHICLE WITH POWER ASSIST
UNITS CONTROLLING BANKING AND OSCILLATION
Filed May 23, 1952  4 Sheets-Sheet 2

INVENTOR.
Joachim Kolbe

Attorneys

March 27, 1956   J. KOLBE   2,739,823
BANKING ARM SUPPORTED VEHICLE WITH POWER ASSIST
UNITS CONTROLLING BANKING AND OSCILLATION
Filed May 23, 1952   4 Sheets-Sheet 3
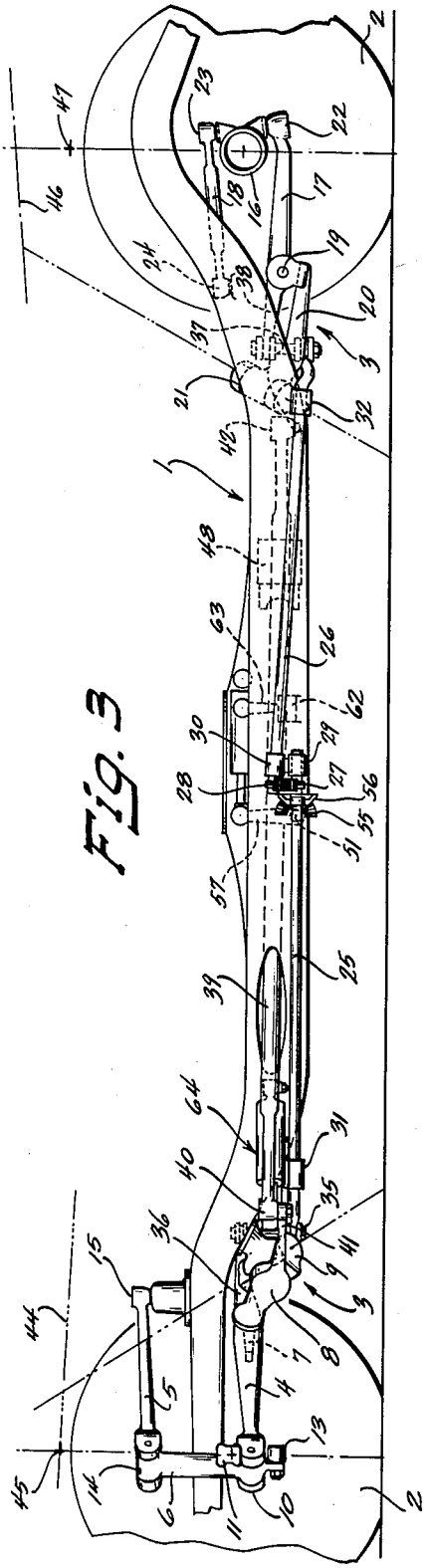
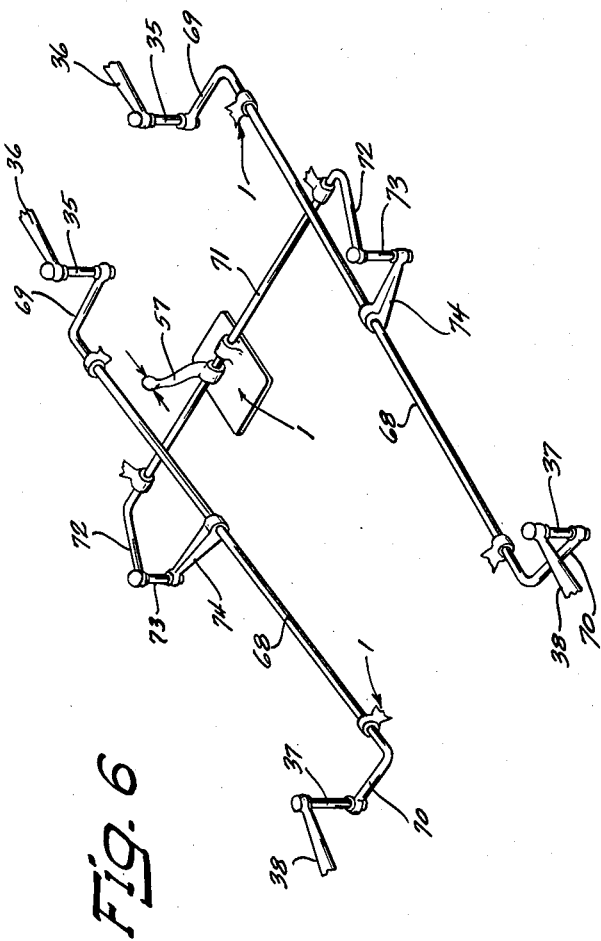
INVENTOR.
Joachim Kolbe
BY
Audrus & Scealer
Attorneys

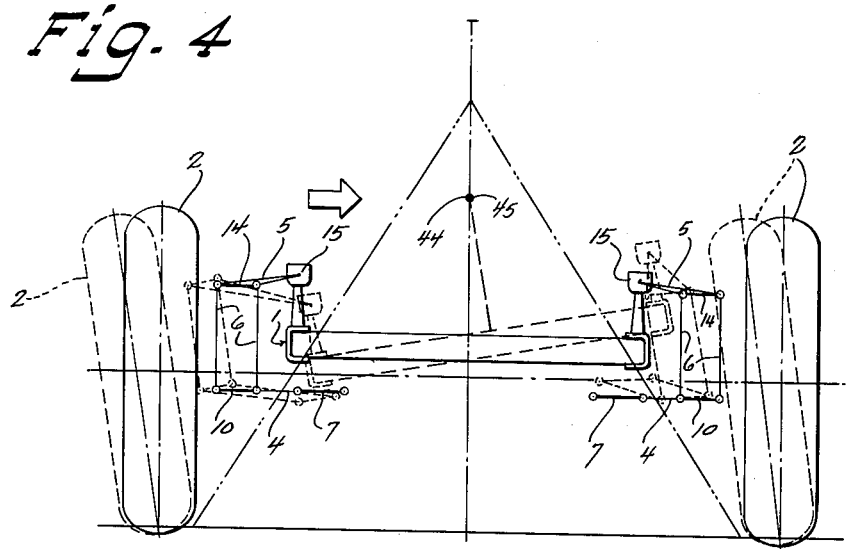

United States Patent Office 2,739,823
Patented Mar. 27, 1956

2,739,823

BANKING ARM SUPPORTED VEHICLE WITH POWER ASSIST UNITS CONTROLLING BANKING AND OSCILLATION

Joachim Kolbe, Sussex, Wis.

Application May 23, 1952, Serial No. 289,513

10 Claims. (Cl. 280—112)

This invention relates to an improved spring suspension for banking vehicles having a superstructure supported by two or more correlated pairs of wheels upon the road to turn during banking about both an effective longitudinally extending axis located near its center of mass and an effective longitudinally extending axis located near the road, and wherein power units control the reaction of longitudinal and lateral forces acting upon the superstructure.

The invention relates more specifically to vehicles in which the superstructure is supported upon a plurality of pairs of interconnected banking arms to effect banking of the superstructure, as described in a number of patents granted to the present inventor. United States Patents No. 2,576,686 and No. 2,580,558 are referred to by way of example.

The banking arms are of the general construction referred to in the above U. S. patents, in which each banking arm extends between the superstructure and the road or its equivalent, and preferably embodies a banking connection between the arm and the superstructure providing for a turn of the entire banking arm relative to the superstructure about an effective inclined banking axis.

A further characteristic of the invention lies in the employment of hydraulic power mechanism arranged to operate the banking mechanism of the vehicle as described in my copending application U. S. Serial No. 286,514, filed May 7, 1952.

Present day automobiles are built as a compromise between ride comfort, efficiency and cost. Banking cars as disclosed by the present inventor are characterized by the introduction of actual riding comfort in response to lateral forces acting upon the vehicle during curve ride. In an effort to keep the cost low, much of the structure needed to satisfy the highly developed straight ahead ride qualities of present day automobiles has to be employed in banking cars to serve simultaneously as a part of the banking structure. However, even small changes in the location of such structure alter the driving quality of the vehicle.

The present invention takes advantage of the fact that the relocation of structure needed to build a simple car mechanism can form the basis for an actual improvement in straight ahead ride comfort as compared to present day cars.

A principal object of the invention is to provide mechanism for reducing the effects of vertical, lateral, and longitudinal forces acting on the wheel suspension upon the passengers of a motor vehicle.

Another object is the provision of an improved balancing mechanism in combination with banking arm structures and arranged to turn the superstructure about a transversely extending axis in response to longitudinal forces exerted on the superstructure.

Another object is to provide improved mechanism for maintaining the superstructure in a level position in reaction to vertical and longitudinal forces and in an improved banked position in reaction to lateral forces, and to provide for hydraulic operation of such mechanism.

Another object is to provide a banking vehicle spring suspension wherein power elements are used to improve the riding qualities of the vehicle by making the spring suspension more flexible for straight ahead ride and stiffer for curve ride and brake application.

Another object is to provide a novel combination of power assisted suspension, banking, and stabilizing structure for motor vehicles.

Another object is to provide fluid pressure means responsive to forces acting upon the vehicle for proportionately regulating the loading of the springs arranged to support the vehicle.

Another object of the invention is to distribute the load on the wheels of a vehicle in which the two pairs of wheels are arranged in tandem relation, as equally as possible.

Another object is to provide adjustable and variable means working in cooperation to secure an improved inclined position of the vehicle superstructure during curve travel without sacrifice in softness of ride during straight ahead travel.

The structure of the vehicle to which the present invention has been applied in general combines banking geometry systems as described in U. S. Patent No. 2,657,067, granted October 27, 1953, to the present inventor with systems disclosed in the U. S. patents referred to above, and relates to the use of combined power assist units for operation of the banking structure in response to lateral forces and for operation of the wheel suspension structure by means of the vehicle support springs in response to longitudinal forces acting upon the vehicle.

The invention is illustrated in the accompanying drawings in which:

Fig. 3 is a side elevation of the vehicle mounting of Fig. 1;

Fig. 4 is a schematic front end elevation of some of the structure shown in Fig. 1, with certain parts additionally shown in dotted outline in the banked position;

Fig. 5 is a schematic rear end elevation of some of the structure shown in Fig. 1, with certain parts additionally shown in dotted outline in the banked position; and Fig. 6 is a schematic perspective view of a spring mechanism for the vehicle in which a continuous torsion spring for each side of the vehicle is arranged to be operated according to the invention.

Figure 1:
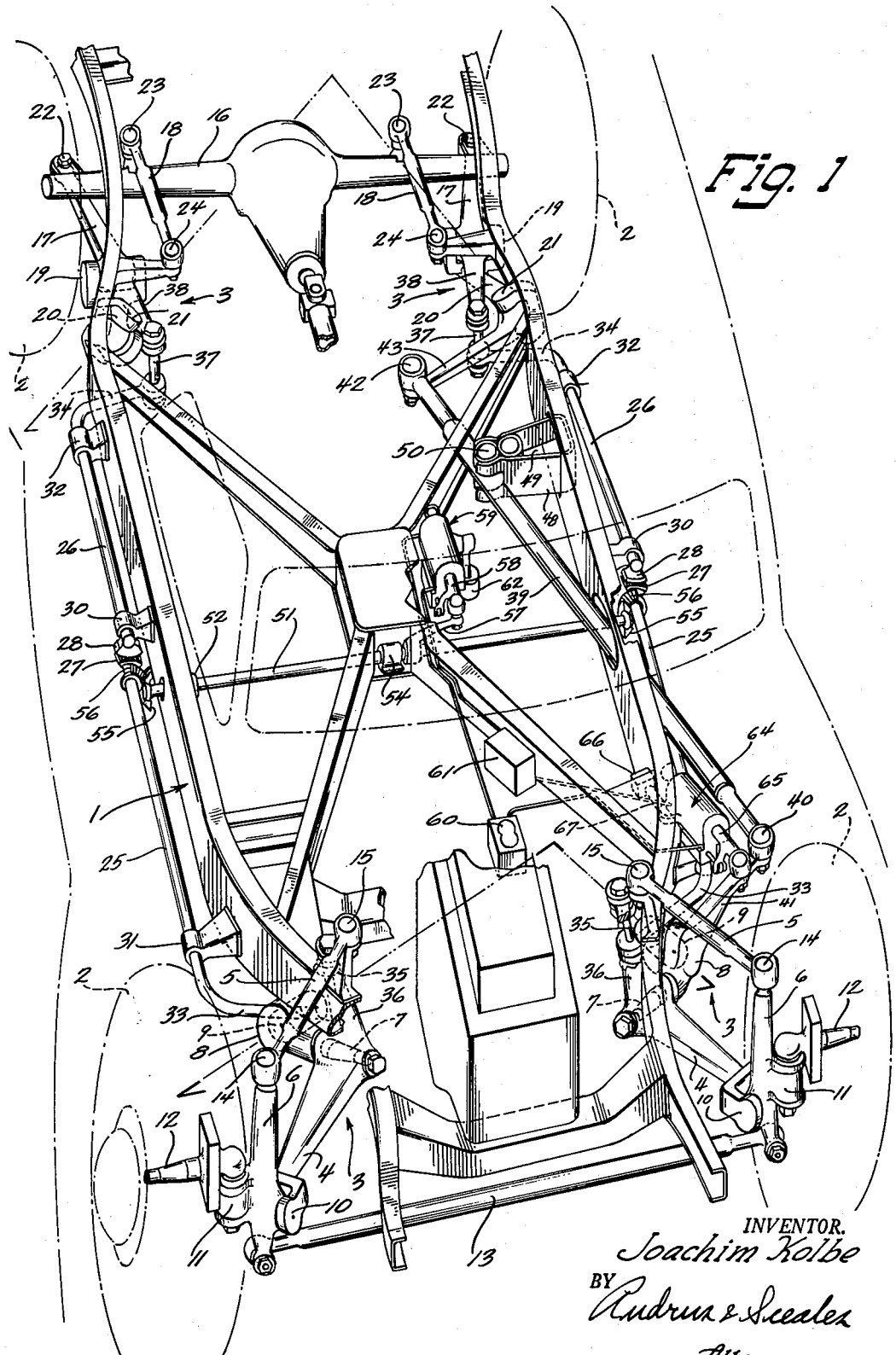
Fig. 1 is a perspective view of a vehicle mounting embodying the invention and showing the superstructure of the vehicle in an upright, unbanked position with hydraulic booster equipment to operate the banking mechanism.
Figure 2:
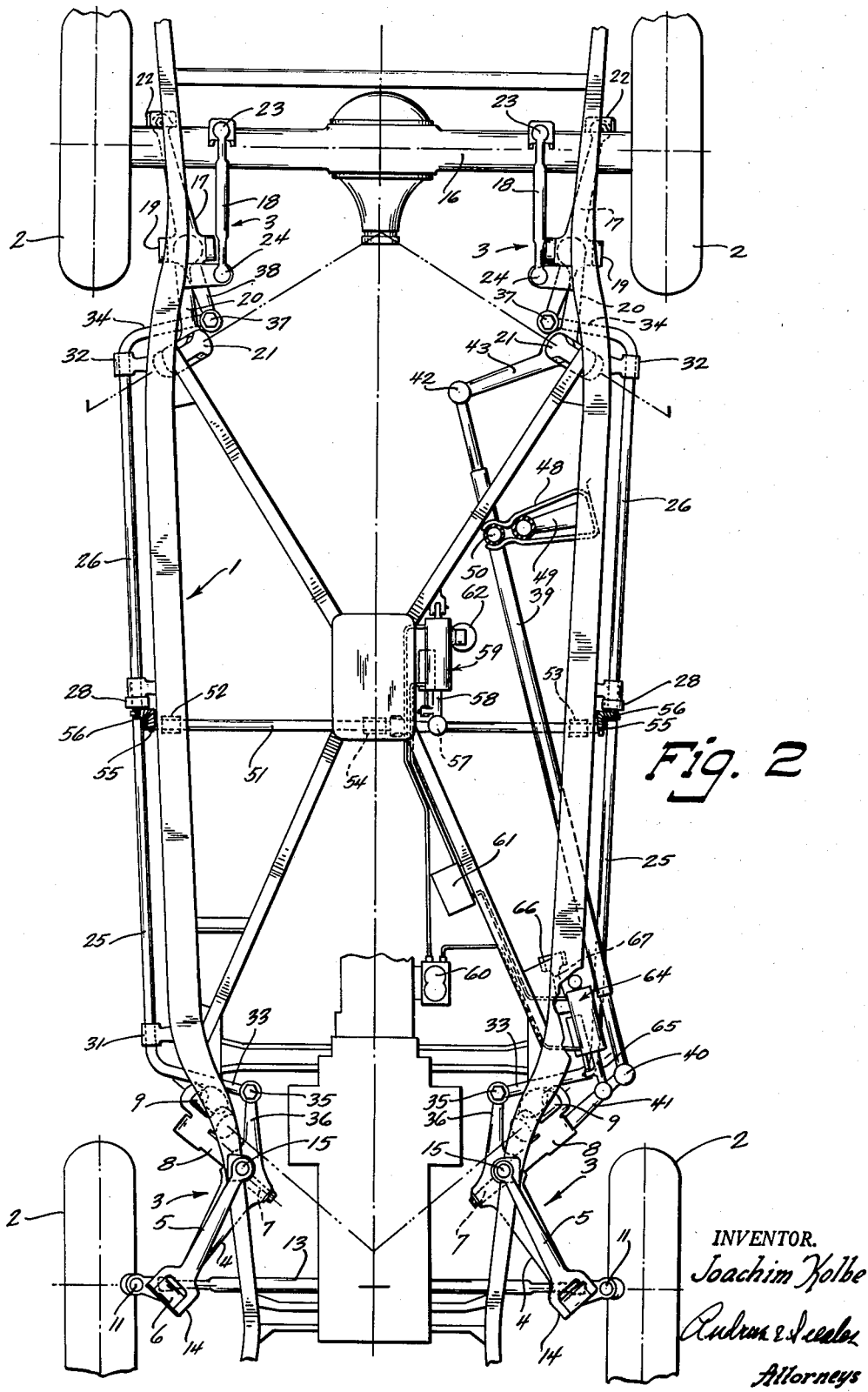
Fig. 2 is a plan view of the vehicle mounting of Fig. 1.

The drawings in general illustrate a vehicle of the passenger automobile type having a superstructure or body shown in broken outline and represented more positively as the chassis frame 1 in full lines supported by the wheels 2 on the road. The wheels are arranged in two pairs, one pair at the front end and the other pair at the rear end of the superstructure. The wheels of each pair are disposed on opposite sides of the superstructure and are equally spaced from the longitudinal center line of the superstructure.

The wheels 2 are secured to the superstructure 1 by the wheel or axle carriers 3 which provide for vertical oscillation of each wheel relative to the superstructure. The wheel or axle carriers 3 are arranged in pairs similar to the wheels and each pair is employed for connecting the corresponding pair of wheels 2 to the superstructure. The front wheels 2 and their corresponding wheel carriers 3 form a front pair of banking arms which support the front end of the superstructure.

Each front wheel carrier 3 consists of a lower suspension arm 4, an upper control arm 5, and a wheel support member 6. The lower suspension arm 4 is pivoted at its inner end by a substantially horizontal hinge 7 to a banking hinge support member 8 which in turn is pivoted to the superstructure by an inclined banking hinge 9. The outer end of the lower suspension arm 4 is pivoted by a substantially horizontal hinge 10 to the lower end of the wheel support member 6. The wheel support member 6 carries the substantially vertical pivotal connection or king pin 11 which in turn guides the spindle member 12.

The lower ends of the wheel support members 6 of the front wheel carriers are interconnected by a suitable tie rod 13 to compel the carriers to operate in unison during banking. The upper control arm 5 of each wheel carrier extends between the superstructure and the wheel support member 6 to which it is connected by the universally movable connection 14. The universally movable connection 15 between the arm 5 and the superstructure is positioned to secure substantially constant caster and also a slight inward lean of the corresponding wheel during the banking of the superstructure.

The rear wheels of the embodiment are carried by a rigid axle structure 16. The rear axle carriers 3 are in the form of banking arms to support the rear end of the superstructure for banking. Each rear carrier 3 consists of a lower suspension arm 17 and an upper control rod 18. The lower suspension arm 17 is pivoted at its forward end by a substantially horizontal hinge 19 to a banking hinge support member 20, which in turn is pivoted to the superstructure by an inclined banking hinge 21. The rearward end of the lower rear suspension arm 17 is pivoted to the axle housing of the rear axle structure 16 by means of a universally movable ball joint 22. The upper rear control rod 18 extends between the axle housing 16 and the superstructure and is connected to both by ball and socket joints 23 and 24 respectively.

According to the invention torsion springs 25 and 26 extend from the center part of the frame to the front and rear banking arms on each side of the superstructure. The inner ends of the springs 25 and 26 overlap each other and are operably connected by toothed sectors 27 and 28 intermediate the length of the frame 1. Springs 25 and 26 are rotatably supported by the frame in bearings 29 and 30 near said sectors and in front and rear bearings 31 and 32 respectively. The front springs 25 are arranged to resiliently carry the front end of the superstructure and the rear springs 26 are arranged to resiliently carry the rear end of the superstructure. For this purpose a lever arm 33 extends inwardly from the front end of each torsion spring 25 and a lever arm 34 extends inwardly from the rear end of each torsion spring 26. The free ends of the front lever arms 33 are connected by means of the corresponding shackles 35 to cantilever arms 36 extending rearwardly from the lower front suspension arm 4. Similarly, the free ends of the rear lever arms 34 are connected by means of the corresponding shackles 37 to the cantilever arms 38 extending forwardly from the corresponding lower rear suspension arm 17.

The length and position of the shackles 35 and 37 and the travel path of the banking arm supported end of each shackle relative to its spring supported end during the turn of the respective banking arm about the nearest banking hinge is a co-determining factor for the banking geometry system as set forth in applicant's Patent No. 2,657,067 last referred to above.

Any vertical oscillation of a single wheel has the benefit of the yielding characteristics of both torsion springs 25 and 26 acting in series, while simultaneous corresponding vertical oscillation of both wheels on one side, of the same magnitude, will result in restricting the yield to the corresponding spring for each wheel.

This means that during straight ahead ride the torsion springs 25 and 26 operate in series to cushion individual vertical oscillation of the wheels, while during curve ride, as centrifugal forces tend to tilt the superstructure to one side, the corresponding movement of both wheels on that side will be resisted by the torsion springs individually and in total amount exerting twice the force for the same magnitude of wheel movement as in the case of single wheel oscillation. This differential in spring actuation is desirable to oppose outward tilting of the superstructure on curves, by a stiff spring resistance, while providing a soft spring ride for normal vertical oscillation of individual wheels.

The front pair of banking arms is correlated in its lateral movement to the rear pair of banking arms by providing a connecting rod 39 between one banking arm in the front and one banking arm in the rear of the vehicle. This connecting rod 39 is pivotally supported in the front by the ball and socket joint 40 carried by the lever arm 41, which extends outwardly from the banking hinge support member 8 and forms a part thereof. In the rear the connecting rod 39 is pivotally supported by the ball and socket joint 42 carried by the lever arm 43 which extends inwardly from the rear banking hinge support member 20 and forms a part thereof.

In the earlier disclosures of this inventor referred to above a banking arm is described as existing between the corresponding banking hinge and the road or its equivalent. Each banking arm is geometrically defined as a plane containing the respective banking hinge axis and the effective road contact point, whereby the line of intersection between the two planes of a pair of banking arms constitutes the motion center line for the banking turn of that part of the superstructure which is supported by the pair. A further requirement of the arrangement is that the motion center line should be located "substantially" above the center of gravity of the part of the superstructure supported by the pair of banking arms to provide in effect a lever of the mass in lateral swinging under the influence of centrifugal forces.

In applicant's application U. S. Serial No. 286,514, filed May 7, 1952, the structure described above has been utilized with less mass leverage by changing the geometric requirements of the banking arm system and employing engine power as made available in present day cars in form of hydraulic, vacuum and compressed air, or electrically controlled booster systems to actuate the banking arm mechanism. The banking motion center axis 44 for the front pair of banking arms can then be located near the height of the center of gravity 45 of the front part of the superstructure. During the turn of the pair of banking arms substantially no lateral shifting of the center of gravity 45 takes place, although the front wheels actually lean inwardly as illustrated in Fig. 4.

In the rear of the vehicle the corresponding center of motion 46 is located only a short distance above the center of gravity 47 for the rear part of the superstructure and the center of gravity moves only a fraction of an inch in the direction of the centrifugal forces as illustrated in Fig. 5.

As in standard cars supported by inedependently suspended front wheels and a rigid rear axle the center of motion for the oscillation of the superstructure relative to the rear axle is located somewhat below the rear axle housing. In the front of the vehicle the center of motion for the oscillation of the superstructure relative to the road is located substantially in the height of the road, since the front wheels are independently suspended. These same conditions with regard to the oscillation motion center are maintained in the vehicle described, and the effect of centrifugal forces on the oscillation system is identical to that on standard cars, subtracting from the improvement achieved by the proposed banking mechanism.

A device spring 48 formed as a U-section leaf spring attached to the frame 1 is arranged to resist fore and aft movement of the connecting rod 39. The two arms of the U lean under pressure against the frame supported bracket 49 and engage the rod 39 at the abutment shaft 50 attached thereto. The connecting rod 39 can shift longitudinally in either direction only after sufficient force is exerted to overcome the resistance of spring 48. The spring 48 serves to keep the superstructure in an upright position even under one sided load conditions exerted on the superstructure which, without this precompressed resilient means, would easily turn about the banking motion center lines 44 in the front of the vehicle and 46 in the rear of the vehicle.

Due to the provision of a soft spring ride for single wheel oscillation the present invention provides an additional resistance where both front wheels or both rear wheels tend to oscillate simultaneously in the same direction.

For this purpose a transversely extending control torsion spring 51 is supported by the frame 1 in two outer bearings 52 and 53 and in the bearing 54 located intermediate its length. The spring is operably connected at both ends by bevel gears 55 and 56 to the front torsion springs 25 which cause the corresponding ends of the control torsion spring 51 to rotate whenever they themselves are turning under the influence of vertical wheel oscillation of the wheels.

By securing the center of transverse torsion spring 51 against uncontrolled turning, as hereinafter described, the opposite ends of the springs 51 function independently and serve to retain the springs 25 and 26 balanced against undue displacement.

Since springs 25 and 26 are soft where rapid changes in speed occur the longitudinal forces on the superstructure tend to cause undue forward or rearward pitching of the superstructure. The present invention provides power means to turn spring 51 thereby actuating the corresponding springs 25 and the corresponding springs 26 in opposite directions to resist the forward or rearward pitching of the superstructure.

For this purpose a vertically extending lever arm 57 carried by the spring 51 intermediate its length supports the outer end of the piston rod 58 of the double acting hydraulic cylinder of servo-motor 59 which is pivotally supported on its rearward end by the frame 1.

The hydraulic pressure needed to operate the rod 39 and through it the banking arm mechanism and also the positioning of the control torsion spring 51 is furnished by the engine of the vehicle which operates the oil pump 60 of the hydraulic power mechanism referred to above. An oil reservoir 61 supplies oil to pump 60.

The servo-motor 59 is controlled by a mass weight 62 disposed for limited forward and rearward movement in response to rapid changes in speed, and preferably carried by a lever arm 63 pivotally connected to the servomotor control mechanism.

When the superstructure changes speed rapidly and tends to pitch either forwardly or rearwardly, accordingly, mass 62 will actuate the follow-up valve of servomotor 59 and thereby effect actuation of the latter in a direction to operate spring 51 and resist the pitch.

The power mechanism also controls the banking of the superstructure by means of a servo-motor 64 carried by the superstructure and connected by means of a piston rod 65 to the forward lever arm 41 or to any other suitable part of the banking mechanism.

The servo-motor 64 is controlled by a mass weight 66 disposed for limited transverse movement in response to centrifugal forces resulting from turning of the vehicle from a straight forward path of travel, and which mass is preferably carried by a lever arm 67 pivotally connected to the servo-motor control mechanism.

When the vehicle rounds a turn in the road the mass 66 will actuate the follow-up valve of servo-motor 64 and thereby effect actuation of the latter in a direction to operate the banking arms and bank the superstructure on the turn. By reason of the servo-motor, the banking obtained is correlated to the centrifugal forces tending to displace the mass 66.

Fig. 6 illustrates a construction utilizing longitudinally extending frame supported torsion springs 68 having their end lever arms extending in opposite directions. The front lever arms 69 extend inwardly and connect with the front shackles 35, and the rear lever arms 70 extend outwardly and connect with the rear shackles 37. The front shackles 35 are pivotally connected to the cantilever arms 36 and the rear shackles 37 are pivotally connected to the cantilever arms 38.

The transverse torsion spring 71 carried by the superstructure has two rearwardly extending lever arms 72 on its outer ends connected by shackles 73 to lever arms 74 extending outwardly from the torsion springs 68 intermediate their length. The torsion spring 71 carries the lever arm 57 which is operated through the double acting hydraulic cylinder of the servo-motor 59. A rearward pull of the lever 57 causes a downward move of the outer ends of lever arms 74 and an outward turn of the torsion bars 68 about their longitudinal axes, a turn which will resist pitching movement of the superstructure during brake application.

The invention provides a vehicle in which the superstructure is banked on turns, and the design may be selective to accomplish the banking either by centrifugal forces, or by power from the engine, or by both means in any desired proportion. The power actuating mechanism may be of any suitable power assist construction similar to that employed in power steering of vehicles.

The invention establishes a new basis for necessary compromises to be made in designing a commercially acceptable banking automobile. The banking arm mechanism calls for longitudinally extending instead of transversely arranged front wheel suspension arms to facilitate the placing of a simple front to rear tie. Proper arrangement and power assisted operation of the springs will secure both banking and improved oscillation in accordance with the invention.

Various embodiments of the invention may be employed within the scope of the following claims.

I claim:

1. A vehicle comprising a superstructure supported by a plurality of pairs of banking arms comprising separate wheels and corresponding wheel carriers, the banking arms of each pair being interconnected and disposed on opposite sides of the superstructure, separate resilient cushion means disposed between the superstructure and the corresponding wheel carriers providing for vertical support of the superstructure and which cushion means tend to yield under the influence of centrifugal forces upon the superstructure on turns to tilt the superstructure outwardly about an oscillation center of motion located near the road, said resilient cushion means being so constructed and arranged that each wheel during its oscillation movement towards the superstructure is opposed by substantially twice the resistance when accompanied by an identical oscillation movement of the other wheel located on the same side of the superstructure, said banking arms being disposed to provide rotational movement of the superstructure about a banking center of motion located near the center of mass of the superstructure, and power actuated means carried by the superstructure and connected to said banking arms to effect said rotational movement of the superstructure in a direction opposite to that effected by the yielding of said cushion means on turns.

2. The structure of claim 1 including inertia weight means carried by the superstructure and responsive to lateral forces upon directional change of the superstructure to actuate said power means.

3. In combination with a vehicle in which the superstructure is spring supported on wheels disposed on opposite sides of the superstructure for vertical oscillation relative to the superstructure tending to turn the superstructure about an oscillation center of motion located near the road and the superstructure is disposed and supported to turn about a banking center of motion located near its center of mass to a banking position, a power assist unit carried by the superstructure and operatively associated with the spring support therefor into effect turning of the superstructure about said banking center of motion, means carried by the superstructure and responsive to centrifugal forces arising from curve ride of the superstructure to operate said power assist unit, a power assist unit carried by the superstructure and operatively associated with the spring support therefor to effect stabilization of the superstructure about a transverse axis located near the road intermediate its pairs of wheels, and means carried by the superstructure and responsive to longitudinal forces of acceleration and deceleration upon the superstructure to operate said last named power assist unit, said power assist units and operating means therefor being operable independently whereby each has its full range of actuation at any given time without interference from the other.

4. A vehicle comprising a superstructure, a plurality of wheels supporting the superstructure for travel, a plurality of wheel carriers connecting the superstructure and wheels and having resilient cushion means disposed to provide for vertical oscillation of the wheels relative to the superstructure; said wheel carriers being disposed to provide: (1) a longitudinally extending oscillation center of motion located near the road about which the superstructure turns under the influence of centrifugal forces tending to tilt the superstructure to the outside of the curve in accordance with a yielding of the cushion means, (2) a transversely extending oscillation center of motion located near the road intermediate the pairs of wheels about which the superstructure rolls under the influence of longitudinal forces in accordance with a yielding of the cushion means, and (3) a banking center of motion located substantially in the longitudinal axis containing the center of gravity of the superstructure and about which the superstructure turns in a direction tending to bank the superstructure on a curve; and power means actuated by hydraulic pressure to operate said wheel carriers and rotate the superstructure upon said banking center of motion under the influence of lateral forces and upon said transversely extending oscillation center of motion under the influence of longitudinal forces.

5. An inward banking vehicle having separate longitudinal and transverse oscillation centers of motion and a banking center of motion for the superstructure, and comprising resilient cushion means controlling the movement of the superstructure about the two oscillation centers of motion, resilient means additionally controlling the roll movement of the superstructure about its transverse center of motion, separate resilient means controlling the movement of the superstructure about the banking center of motion, power means carried by the superstructure and operatively associated with said additional resilient means to actuate the same in a direction opposing longitudinal roll movement of the superstructure, and separate power means carried by the superstructure and disposed to actuate the banking motion of the superstructure free from interference by said first named power means, said power means comprising separate double acting hydraulic cylinders with corresponding servo control valves, and a common pressure fluid supply reservoir and pump.

6. A vehicle adapted to bank on turns comprising a superstructure and a plurality of pairs of laterally opposed banking arms resiliently supporting said superstructure and extending from the superstructure to the effective road support therefor, said pairs of banking arms being spaced longitudinally of the superstructure and correlated with each other to provide a common axis of rotation for the superstructure during banking and which axis is substantially parallel to the longitudinal center line of the superstructure at all times and located near the center of gravity of the superstructure and to provide a transversely extending roll center near the road, and a device for controlling the direction of turn of the banking arms and for the direction of roll of the superstructure when under the influence of lateral and longitudinal forces, said device comprising a hydraulic motor connected to at least one of said banking arms, to the resilient means and to the superstructure, reversible fluid inlet and outlet conduits for said motor, normally closed servo valves in said conduits, a lever supported weight connected to said valves, and means operative upon a predetermined degree of rotation of the weight opening said valves to shift the superstructure into a predetermined position relative to the road.

7. A vehicle adapted to bank on turns comprising a superstructure, at least one transverse axle structure, a plurality of pairs of laterally opposed interconnected banking arms resiliently supporting said superstructure, said pairs of banking arms being spaced longitudinally of the superstructure with at least one pair connected at the outer ends thereof by universally movable joints to said axle structure, each banking arm of said last named pair being secured at its inner end to the superstructure to turn on a skew banking line which is correlated to the banking line of the other arm of the pair to provide a motion center line for the pair extending above the effective center of mass supported by the arms of the pair and disposed substantially horizontally and said pairs of banking arms being interconnected and correlated with each other to provide a common axis of rotation for the superstructure during banking, resilient means extending between the banking arms and the superstructure, additional resilient means for controlling the position of said first named resilient means, and a power operable means connected to said additional resilient means and adapted to stabilize the same for vertical oscillation of the superstructure when in a neutral position, and control means to actuate said power means under the influence of longitudinal forces to elevate one end of the superstructure and to depress the other relative to the wheels.

8. A vehicle comprising a superstructure adapted to bank on turns, a plurality of pairs of opposed banking arms disposed to support said superstructure and spaced longitudinally of the same with at least one pair arranged in the front and at least one pair in the rear of the superstructure and with the banking arms of each pair connected to the superstructure laterally apart on opposite sides of the longitudinal center line of the superstructure, means interconnecting the banking arms of each pair to retain the outer ends of the banking arms in substantially constant spaced relation, means interconnecting the pairs of banking arms to induce the front and rear pairs of wheels to move laterally substantially in unison during the banking of the superstructure; said front pair of banking arms comprising independently suspended front wheel carriers each comprising a king pin support, a suspension arm hingedly connected to said support, a member connected to said suspension arm on a substantially horizontal axis and connected to the superstructure along an upwardly inclined hinge axis, a second suspension member connected by ball and socket joints to said support and to said superstructure at a point displaced from said axis, and resilient means tending to maintain the suspension arms in normal position; control means supported by the superstructure and operably connected to said resilient means, and power operated means arranged to effect a repositioning of said control means and said resilient means and to thereby turn the superstructure about a transverse horizontal axis located intermediate the pairs of wheels and substantially in height of the road.

9. A vehicle comprising a superstructure adapted to bank on turns, a plurality of pairs of opposed banking arms disposed to support said superstructure and spaced longitudinally of the same with one pair arranged in the front of the superstructure constituting independent wheel carriers and one pair arranged in the rear of the superstructure and supported by a rigid axle structure and with the banking arms of each pair connected to the superstructure laterally apart on opposite sides of the longitudinal center line of the superstructure, means interconnecting the banking arms of the pair of banking arms disposed in the front of the vehicle to retain the other ends of the banking arms in substantially constant spaced relation, a tie connecting at least one banking arm disposed in the front of the vehicle to one banking arm disposed in the rear of the vehicle, to induce the front and rear pairs of banking arms to move laterally substantially in unison during the banking of the superstructure; each banking arm comprising a wheel support member, a lower suspension arm hingedly connected to the wheel support member, a bracket hingedly connected to the lower suspension arm and connected to the superstructure on a hinge axis inclined both laterally and longitudinally of the vehicle, and an upper suspension arm pivotally connected to the wheel supporting member and pivotally connected to the superstructure at a point lying outside of said inclined axis; said lower wheel suspension arms having support arms cantilevering rearwardly in the front of the vehicle and forwardly in the rear of the vehicle, frame supported front and rear torsion springs extending longitudinally from points intermediate the pairs of wheels towards the front and rear and operably connected by means of lever arms and shackles to said cantilever support arms and by means of gears to each other, resilient control means operably connected by means of gears to said resilient means, and a device for turning the banking arms at said inclined hinge axes and comprising a hydraulic servo-motor, a source of fluid pressure, fluid conduits connecting said motor and source, a lever supported weight connected to said servo-motor to effect operation of the same upon a predetermined degree of shifting of the weight under the influence of centrifugal forces to thereby shift the superstructure and wheels into a predetermined banked position relative to the road.

10. A vehicle comprising a superstructure adapted to bank on turns, a plurality of pairs of opposed banking arms disposed to support said superstructure and spaced longitudinally of the same with one pair arranged in the front of the superstructure constituting independent wheel carriers and one pair arranged in the rear of the superstructure and supported by a rigid axle structure and with the banking arms of each pair connected to the superstructure laterally apart on opposite sides of the longitudinal center line of the superstructure, means interconnecting the banking arms of the pair of banking arms disposed in the front of the vehicle to retain the outer ends of the banking arms in substantially constant spaced relation, a tie connecting at least one banking arm disposed in the front of the vehicle to one banking arm disposed in the rear of the vehicle, to induce the front and rear pairs of banking arms to move laterally substantially in unison during the banking of the superstructure; each banking arm comprising a wheel support member, a lower suspension arm hingedly connected to the wheel support member, a bracket hingedly connected to the lower suspension arm and connected to the superstructure on a hinge axis inclined both laterally and longitudinally of the vehicle, and an upper suspension arm pivotally connected to the wheel supporting member and pivotally connected to the superstructure at a point lying outside of said inclined axis; said lower wheel suspension arms having support arms cantilevering towards the center of the vehicle, frame supported torsion springs extending longitudinally between the front and rear of the vehicle and operably connected by means of lever arms and shackles to said cantilever support arms, control means operably connected by means of lever arms and shackles to said torsion springs, and a device for turning the banking arms at said inclined hinge axes, comprising a hydraulic servo-motor, a source of fluid pressure, fluid conduits connecting said motor and source, a lever supported weight connected to said servo-motor to effect operation of the same upon a predetermined degree of shifting of the weight under the influence of lateral forces to thereby shift the superstructure and wheels into a predetermined position relative to the road.

References Cited in the file of this patent

UNITED STATES PATENTS

| | | |
|---|---|---|
| 2,110,809 | Murphy | Mar. 8, 1939 |
| 2,152,938 | Welch | Apr. 4, 1939 |
| 2,181,161 | Wolf | Nov. 28, 1939 |
| 2,247,749 | DeVenel | July 1, 1941 |
| 2,260,102 | Freret | Oct. 21, 1941 |
| 2,353,503 | Rost | July 11, 1944 |

FOREIGN PATENTS

| | | |
|---|---|---|
| 641,418 | Great Britain | Aug. 9, 1950 |